Oct. 10, 1961  K. SATTLER  3,003,743
VALVE WITH PRESSURE BALANCING DIAPHRAGMS
Filed Dec. 21, 1959
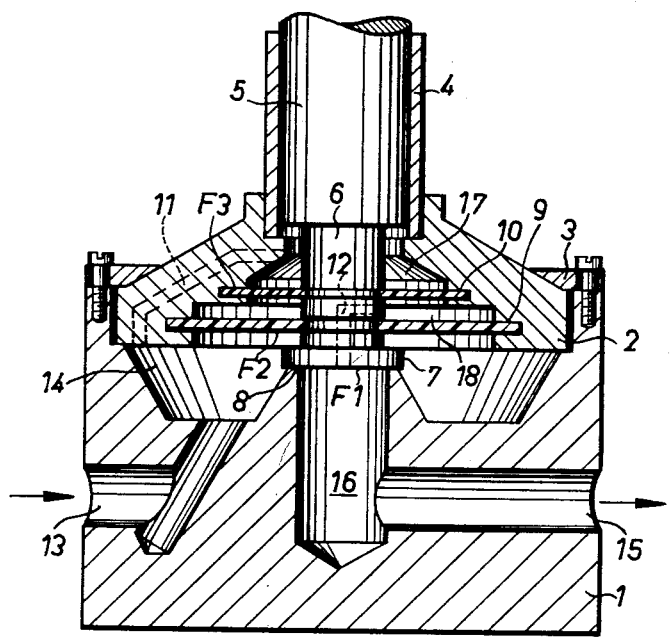
INVENTOR
KLAUS SATTLER
BY
ATTORNEYS United States Patent Office 3,003,743
Patented Oct. 10, 1961

3,003,743
VALVE WITH PRESSURE BALANCING
DIAPHRAGMS
Klaus Sattler, Stuttgart, Germany, assignor to Concordia
Maschinen- & Elektrizitats-G.m.b.H., Stuttgart, Germany
Filed Dec. 21, 1959, Ser. No. 861,092
Claims priority, application Germany Dec. 22, 1958
3 Claims. (Cl. 251—282)

The present invention relates to a high-pressure valve in which the pressures are balanced so as only to require a small force to operate the valve.

This purpose was attained prior to this invention by valves with two valve seats, in which the full cross-sectional area of flow of the valve was divided by these valve seats into two parts, so that the forces occurring in each of them would balance each other. Such valves have the disadvantage that even very small unavoidable differences in the distances of the valve plates from the valve seats render the pressure relief ineffective and cause a considerable disturbance of the desired pressure balance, even though these differences in the sizes might be compensated by elastic sealing elements.

It is also already known to design the valve rods in the form of pressure-balance pistons or to provide them with such pistons. Such valves must, however, be properly sealed at both sides of the pistons which results in a strong static friction, especially when the valve has not been in operation for a great length of time. If the pressure medium to be controlled by the valve is of a gaseous form, there must be a sufficient sealing pressure provided by the valve. The static friction is also dependent upon the differential pressure between the two sides of the sealing elements.

In diaphragm valves the pressure-balance principle cannot be applied in such a simple manner. Such valves generally have a relatively small inner width so that the unclamped effective area of the balancing diaphragm will necessarily be relatively small. The required strokes of the valve then necessitate, however, such considerable deformations of the diaphragm that the forces to be applied will overstrain the material of the diaphragm with the result that after a relatively short time the diaphragm will be ruined. The flexing resistance of the diaphragm also increases considerably as the size of the stroke of the respective valve is increased so that the pressure will no longer be accurately balanced.

It is the object of the present invention to provide a diaphragm valve in which the pressures are relieved or balanced and which, contrary to the known types of such valves, is provided with a combination of two pressure-balancing diaphragms which form a single functional unit. These two diaphragms are arranged so that the effective area of one diaphragm differs from the effective area of the other diaphragm by the cross-sectional size of the valve port. In this manner it is possible to make the outer diameter of the two diaphragms of a size independent of the cross-sectional size of the valve port. The difference in the size of the two balancing diaphragms also produces the result that the pressures acting upon them will compensate each other to such an extent that only the difference in their surface area will be utilized for relieving the load upon the valve closing means.

Since the diameters of the effective area of the diaphragms are not dependent either upon the cross-sectional size of the valve in other respects, or upon the pressure of the pressure medium which is to be controlled by the valve, it will be evident that the diaphragms may be made of any dimensions in accordance with the kind and size of the valve which is most suitable for the particular purpose. The balancing diaphragms may also be made of such diameters that the stresses upon them by the reciprocating operation of the valve will never be unduly large and will affect their life as little as possible. The flexing resistance of the diaphragms may thus also be made of a constant value so that a complete pressure balance will be attained and constantly maintained. Consequently, the entire valve according to the invention will remain properly operative for a much greater length of time than other diaphragm valves as were previously designed.

The functional unity of the two balancing diaphragms is attained according to the invention by mounting them parallel and in a spaced relation to each other and in a manner so that the sides of the two diaphragms which face toward each other enclose a compensating chamber which communicates through a connecting channel with the outlet chamber of the valve. The other sides of the two diaphragms facing in opposite directions to each other communicate, however, with the inlet chamber of the valve, for which purpose one diaphragm faces directly toward the inlet chamber, while the other diaphragm communicates therewith through a suitable connecting channel. The pressures acting upon the balancing diaphragms therefore compensate each other, except for the pressure which is incurred by the difference in the effective diameters of the diaphragm and which is dependent upon the inner width of the valve port.

In place of such a directly acting valve, the present invention may, of course, also be applied to an indirectly acting valve. It is also immaterial to the invention whether the valve is one of a straight-way, two-way, or multiway type, and the valve according to the invention may also be modified to be used as a servo valve. Furthermore, this valve is not dependent upon any particular driving means for operating the same. The present invention is therefore one in principle and does not depend upon any particular type or manner of design or construction.

These and other objects, features, and advantages of the present invention will become further apparent from the following detailed description thereof, particularly when the same is read with reference to the accompanying drawing which shows diagrammatically a central vertical cross section of one preferred embodiment of the invention.

As illustrated in the drawing, the diaphragm valve according to the invention consists of a valve body 1, the open side of which is closed toward the outside by a cover member 2 which is removably secured to valve body 1 by means of an annular disk 3 or any other suitable means. Cover member 2 also carries a tubular guide member 4 in which a member 5 is slideably movable which may consist of a plunger or a magnet armature. This member 5 carries a valve spindle 6 with a valve plate 7 thereon which is adapted to open and close the valve port 8. The valve is further provided with an inlet 13 which is connected to the inlet chamber 14, and with an outlet 15 which is connected to the outlet chamber 16.

According to the invention, cover member 2 has two annular pressure-balancing diaphragms installed therein, namely, an inner diaphragm 9 and an outer diaphragm 10. The outer edges of these diaphragms are clamped within cover member 2, while the inner edges are secured to valve spindle 6. Diaphragms 9 and 10 extend parallel to and are spaced from each other so as to form an intermediate relief chamber 18.

Above diaphragm 10, cover member 2 contains a balancing chamber 17 which communicates through a connecting channel 11 in the body of cover member 2 with inlet chamber 14. Relief chamber 18 further communicates through a connecting channel 12 in valve spindle 6 or also in cover member 2 with the outlet chamber 16. The two sides of each diaphragm 9 and 10 are therefore in direct communication with inlet chamber 14 and outlet chamber 16, respectively. The inner balancing diaphragm 9 then limits the inlet chamber 14 or, if the connecting channels 11 and 12 are arranged accordingly, also the outlet chamber 16.

The inner diaphragm 9 has a larger effective area than the outer diaphragm 10. More particularly, the free effective area F2 of diaphragm 9 is larger than the free effective area F3 of diaphragm 10 by the size of the inner effective area F1 of the valve port 8.

The respective areas are therefore determined according to the formula F2=F1+F3. Consequently, a complete pressure balance or, if desired, a partial pressure relief which may be accurately determined and which is independent of the inner width of the valve port, the pressure of the respective pressure medium, the other structural features of the valve, and the manner in which it is driven. The mentioned formula also indicates that the outer diameter of the two balancing diaphragms 9 and 10 may be selected independently of the valve port 8 in accordance with the most suitable manufacturing conditions, in which event they may merely differ from each other in accordance with the factor F3.

When the valve is closed, the pressure of the liquid or gaseous medium, acts from below upon the effective area F2 of diaphragm 9 and at the same time through the connecting channel 11 from above upon the effective area F3 of diaphragm 10. Since guide tube 4 is closed or sealed in the usual manner at its upper end, not shown, toward the outside, the pressure from above upon the effective area F3 can effect diaphragms 9 and 10 only in accordance with the difference in the surface area between the diaphragms, that is, in accordance with the formula F2=F1+F3 or F1=F2−F3. If a back-pressure should occur from the outlet 15, it will act from below upon the surface F1 and through the connecting channel 12 from below upon the effective area F3 of diaphragm 10, and also from above upon the effective area F2 of diaphragm 9. In accordance with the same formula, the pressures upon surfaces F2 and F3 will therefore compensate each other and will not affect the diaphragms 9 and 10.

When the valve is opened, the pressure of the pressure medium will act upon both diaphragms and simultaneously upon both sides thereof so that the same differential effect will be attained as indicated in the mentioned formula. This means that in each individual case, that is, at each position of the valve during its operation, a complete pressure balance will be attained independently of the pressure of the pressure medium and of a possible back-pressure which might occur.

A further important advantage of the valve according to the present invention consists in the fact that diaphragms 9 and 10, cover member 2, valve plate 7, valve spindle 6, and the drive elements of the valve are combined to form a closed structural unit which may be easily and quickly assembled and disassembled without requiring any removal of the valve body 1 from the connecting lines leading thereto. All of the movable parts are therefore contained at the inside of the valve. The valve body may be of the conventional size, no special valve structure is required, and the space required by the valve is not increased. If one of the two diaphragms should become leaky, the pressure medium cannot escape toward the outside since the valve is completely closed at all times toward the outside.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A pressure-balanced valve comprising a valve body having a valve chamber and a valve port therein, an inlet and an outlet channel connected to said chamber and valve port, respectively, a valve member adapted to move within said valve body to open and close said valve port, and a pair of diaphragms within said chamber and secured, on the one hand, to said valve member and, on the other hand, to said valve body, said diaphragms dividing said chamber into an inlet chamber at one side of said diaphragms, a compensating chamber between said two diaphragms, and a balancing chamber at the other side of said diaphragms, a channel connecting said inlet and balancing chambers, and a channel connecting said compensating chamber with said valve port and outlet channel, one of said diaphragms having an effective surface area greater than the effective surface area of the other diaphragm by the size of said valve port, the actual size of said diaphragms being, however, independent of the size of said valve port.

2. A pressure-balanced valve as defined in claim 1, in which said two diaphragms are mounted parallel and in a spaced relation to each other so that the sides of said diaphragms facing toward each other form said compensating chamber, the other side of the larger diaphragm facing toward and limiting said inlet chamber, and the other side of the smaller diaphragm facing toward and limiting said balancing chamber.

3. A pressure-balanced valve as defined in claim 2, in which said valve body has a cover member removably secured thereto, said valve body and said cover member having recesses therein together defining said valve chamber, said diaphragms being of an annular shape and secured at their peripheral edges to the inside of said cover member and at their inner edges to said valve member, said valve member having an end portion within said valve chamber and facing toward said valve port, said end portion forming a valve plate for opening and closing said port, and means on said cover member for guiding said valve member for reciprocating movements relative to said valve port and for sealing said valve chamber and valve member toward the outside.

References Cited in the file of this patent
UNITED STATES PATENTS
2,720,891  Glasgow _____ Oct. 18, 1955